(12) United States Patent
Suzuki et al.

(10) Patent No.: US 8,545,978 B2
(45) Date of Patent: Oct. 1, 2013

(54) COMPOSITE FILM

(75) Inventors: Hidenori Suzuki, Osaka (JP); Masanori Uesugi, Osaka (JP); Makoto Kai, Osaka (JP); Mitsuyoshi Shirai, Osaka (JP)

(73) Assignee: Nitto Denko Corporation, Osaka (JP)

( * ) Notice: Subject to any disclaimer, the term of this patent is extended or adjusted under 35 U.S.C. 154(b) by 270 days.

(21) Appl. No.: 13/061,766

(22) PCT Filed: Sep. 2, 2009

(86) PCT No.: PCT/JP2009/065299
§ 371 (c)(1),
(2), (4) Date: Mar. 2, 2011

(87) PCT Pub. No.: WO2010/026980
PCT Pub. Date: Mar. 11, 2010

(65) Prior Publication Data
US 2012/0021208 A1    Jan. 26, 2012

(30) Foreign Application Priority Data
Sep. 2, 2008  (JP) ................................. 2008-224717

(51) Int. Cl.
*B32B 27/08* (2006.01)
*B32B 7/12* (2006.01)
*B32B 27/40* (2006.01)
*B32B 27/00* (2006.01)

(52) U.S. Cl.
USPC ......... 428/335; 428/343; 428/423.1; 428/500

(58) Field of Classification Search
None
See application file for complete search history.

(56) References Cited

U.S. PATENT DOCUMENTS

| | | | |
|---|---|---|---|
| 2006/0188725 | A1 | 8/2006 | Yoshida et al. |
| 2007/0141328 | A1 | 6/2007 | Kamiyama |
| 2009/0239060 | A1 | 9/2009 | Tomino |
| 2011/0021705 | A1 | 1/2011 | Imoto et al. |
| 2012/0021208 | A1 | 1/2012 | Suzuki et al. |
| 2012/0028040 | A1 | 2/2012 | Kai et al. |

FOREIGN PATENT DOCUMENTS

| | | | |
|---|---|---|---|
| CN | 1827367 | A | 9/2006 |
| EP | 2213698 | A1 | 8/2010 |
| JP | 6-55896 | A | 3/1994 |
| JP | 2000-230115 | A | 8/2000 |
| JP | 2000-248238 | A | 9/2000 |
| JP | 2001-11403 | A | 1/2001 |
| JP | 2003-096140 | A | 4/2003 |
| JP | 2003-171411 | A | 6/2003 |
| JP | 2004-010661 | A | 1/2004 |
| JP | 2004-010662 | A | 1/2004 |
| JP | 2006-248120 | A | 9/2006 |
| JP | 2006-259324 | A | 9/2006 |
| JP | 2007-197668 | A | 8/2007 |
| JP | 2007-522957 | A | 8/2007 |
| JP | 2008-75007 | A | 4/2008 |
| JP | 2009/120663 | * | 4/2009 |
| JP | 2009-120663 | A | 6/2009 |
| JP | 2012-46723 | A | 3/2012 |
| WO | 2010/026980 | A1 | 3/2010 |

OTHER PUBLICATIONS

Office Action, dated Nov. 5, 2012, issued by the State Intellectual Property Office of P.R. China in counterpart Chinese Application No. 200980134360.8.
Office Action, dated Oct. 30, 2012, issued by the Japanese Patent Office in counterpart Japanese Patent Application No. 2009-186274.
Extended European Search Report dated Aug. 4, 2011, in counterpart European Application No. 09811505.8.
Office Action dated Mar. 27, 2013 from the State Intellectual Property Office of P.R. China in counterpart Chinese application No. 200980134360.8.
Office Action, dated Jun. 20, 2013, issued by the State Intellectual Property Office of the People's Republic of China in counterpart Chinese Application No. 200980134360.8.
European Office Action dated Jun. 17, 2013 issued by the European Patent Office in counterpart European Application No. 09811505.8.

* cited by examiner

*Primary Examiner* — Sheeba Ahmed
(74) *Attorney, Agent, or Firm* — Sughrue Mion, PLLC

(57) ABSTRACT

To provide a composite film having low-temperature flexibility. The composite film including an acrylic polymer and a urethane polymer, in which the acrylic polymer includes an acryl component containing at least an acrylic acid-based monomer and a monofunctional acrylic monomer whose homopolymer has a glass transition temperature (Tg) of 273 K or more; the content of said acrylic acid-based monomer in said composite film is from 0.5 to 15 wt %; the glass transition temperature (Tg ac) of the acrylic polymer is 273 K or more; the glass transition temperature (Tg ur) of the urethane polymer is 273 K or less; and the glass transition temperature (Tg) of the composite film is 269 K or less.

9 Claims, No Drawings

COMPOSITE FILM

TECHNICAL FIELD

The present invention relates to a composite film containing an acrylic polymer and a urethane polymer, which is a composite film used, for example, for exterior protection or decoration of buildings, automobiles and the like. More specifically, the present invention relates to a composite film having flexibility.

BACKGROUND ART

A composite film of an acrylic polymer and a urethane polymer is known as a film capable of satisfying both high strength and high breaking elongation and is disclosed, for example, in JP-A-2003-96140, JP-A-2003-171411, JP-A-2004-10661 and JP-A-2004-10662. These composite films have tough physical properties as a film, such as high strength and high breaking elongation, but in use, for example, as a base material of a pressure-sensitive adhesive for protecting the automotive painted surface or the like, the flexibility of the film is disadvantageously insufficient. Particularly, when working in a low-temperature state, for example, working of laminating a pressure-sensitive adhesive sheet to an adherend in cold regions, is performed, the film cannot follow the unevenness of the adherend surface due to insufficient flexibility of the base material and is sometimes separated or lifted.

BACKGROUND ART DOCUMENT

Patent Documents

Patent Document 1: JP-A-2003-96140
Patent Document 2: JP-A-2003-171411
Patent Document 3: JP-A-2004-10661
Patent Document 4: JP-A-2004-10662

SUMMARY OF THE INVENTION

Problems that the Invention is to Solve

The present invention has been made to solve the above-described problems, and an object of the present invention is to provide a composite film having low-temperature flexibility.

Means for Solving the Problems

A composite film of the invention includes an acrylic polymer and a urethane polymer, in which the acrylic polymer includes an acryl component containing at least an acrylic acid-based monomer and a monofunctional acrylic monomer whose homopolymer has a glass transition temperature (Tg) of 273 K or more; a content of the acrylic acid-based monomer in the composite film is from 0.5 to 15 wt %; a glass transition temperature (Tg ac) of the acrylic polymer, represented by the following formula (1), is 273 K or more; a glass transition temperature (Tg ur) of the urethane polymer is 273 K or less; and a glass transition temperature (Tg) of the composite film, represented by the following formula (2), is 269 K or less:

[Math. 1]

$$\frac{1}{Tg\,ac} = \sum_{n=1}^{n} \frac{Wn}{Tg\,n} \quad (1)$$

Tg ac: the glass transition temperature (temperature unit: K) of the acrylic polymer,
Tg n: the glass transition temperature (temperature unit: K) when the acrylic monomer becomes a homopolymer, and
Wn: the weight fraction of the monomer components based on the entire acrylic polymer (here, the total sum of monomer components is $\Sigma Wn=1$);

[Math. 2]

$$\frac{1}{Tg\,com} = \frac{W\,ac}{Tg\,ac} + \frac{W\,ur}{Tg\,ur} \quad (2)$$

Tg com: the glass transition temperature (temperature unit: K) of the composite film,
Tg ac: the glass transition temperature (temperature unit: K) of the acrylic polymer calculated according to formula (1),
Tg ur: the glass transition temperature (temperature unit: K) of the urethane polymer,
W ac: the weight fraction of the acrylic polymer in the composite film, and
W ur: the weight fraction of the urethane-based polymer in the composite film (here, Wac+Wur=1).

In the present invention, the composite film preferably has, in a tensile test at 5° C., a maximum load in an elongation range of 0.1 to 20.0% of 30 N/10 mm or less.

Also, the composite film preferably has, in a tensile test at 20° C., a breaking load of 30 N/10 mm or less and an elongation of 150% or more.

In the present invention, a weight ratio between the acrylic polymer and the urethane polymer is preferably from 20/80 to 80/20.

In the present invention, a coat layer can be further provided on at least one surface of the composite film.

Also, a pressure-sensitive adhesive layer can be further provided on at least one surface of the composite film.

In the present invention, it is preferable that a coat layer having a thickness of 1 to 50 μm is provided on one surface of the composite film and a pressure-sensitive adhesive layer is provided on another surface thereof.

In the present invention, an application tape can be further provided on the coat layer.

Advantage of the Invention

According to the present invention, a composite film with low-temperature flexibility can be realized. Also, according to the present invention, a composite film further having a pressure-sensitive adhesive layer can be provided.

MODE FOR CARRYING OUT THE INVENTION

The present invention is described in detail below.
The composite film of the present invention includes an acrylic polymer and a urethane polymer. The acrylic polymer is preferably obtained using an acryl component containing at least an acrylic acid-based monomer and a monofunctional acrylic monomer. The monofunctional acrylic monomer is conditioned on that the glass transition temperature (Tg) of its homopolymer is 273 K or more.

In the present invention, the acrylic polymer may further contain other acrylic monomers. For example, the acrylic polymer may be obtained using an acryl component further containing a monofunctional acrylic monomer whose homopolymer has a glass transition temperature (Tg) of less than 273 K.

In the present invention, the acrylic acid-based monomer is a carboxyl group-containing acrylic monomer, and examples thereof include an acrylic acid, a methacrylic acid, a maleic acid and a crotonic acid. Among these, an acrylic acid is preferred. The content of the acrylic acid-based monomer is from 0.5 to 15 wt %, preferably from 1.0 to 10 wt %, based on the later-described composite film. If the content of the acrylic acid-based monomer is less than 0.5 wt %, a long time is required for the reaction, and film formation is extremely difficult. Also there may arise a problem that the film strength is insufficient. If the content of the acrylic acid-based monomer exceeds 15 wt %, the water absorption rate of the film increases and a problem may arise in the water resistance. In the present invention, the (meth)acrylic acid-based monomer greatly affects the compatibility between the urethane component and the acryl component and has a very important function.

Incidentally, in the present invention, the "film" is used as a concept including a sheet, and the "sheet" is used as a concept including a film. Also, in the present invention, the "acryl" as in an acrylic polymer or an acrylic acid-based monomer is a concept indicating a collective term of methacryl and acryl.

In the present invention, examples of the monofunctional acrylic monomer whose homopolymer has a glass transition temperature (Tg) of 273 K or more include acryloyl morpholine, isobornyl acrylate, dicyclopentanyl acrylate, tert-butyl acrylate, cyclohexyl acrylate, stearyl acrylate, lauryl acrylate and benzyl acrylate. One of these may be used alone, or two or more thereof may be used in combination. In the present invention, use of isobornyl acrylate is preferred.

The content of the monofunctional acrylic monomer whose homopolymer has Tg of 273 K or more is preferably from 20 to 99 wt %, more preferably from 30 to 98 wt %, based on the acryl component. If the content of the monofunctional acrylic monomer is less than 20 wt %, there may arise a problem that the film strength is insufficient, whereas if it exceeds 99 wt %, the film may be excessively increased in rigidity and become brittle.

Examples of other acrylic monomers include methoxytriethylene glycol acrylate, methyl acrylate, ethyl acrylate, n-butyl acrylate, isobutyl acrylate, 2-ethylhexyl acrylate, isooctyl acrylate, 2-methoxyethyl acrylate, tetrahydrofurfuryl acrylate, phenoxyethyl acrylate, ethoxyethyl acrylate, 3-methoxybutyl acrylate, and ethylcarbitol acrylate. One of these may be used alone, or two or more thereof may be used in combination.

The monofunctional acrylic monomer whose homopolymer has Tg of less than 273 K may not be contained (the content is 0 wt %), but in the case of containing this monomer, the content thereof is preferably from more than 0 wt % to 50 wt %, more preferably from more than 0 wt % to 45 wt %, based on the acryl component. If the content of this monofunctional acrylic monomer exceeds 50 wt %, there may arise a problem that the film strength is insufficient.

In the present invention, the glass transition temperature (Tg ac) of the acrylic polymer is preferably 273 K or more. If the glass transition temperature (Tg ac) of the acrylic polymer is less than 273 K, the composite film is decreased in the strength and may not be suited for use as a film, but when the glass transition temperature (Tg ac) is 273 K or more, the strength of the composite film can be sufficiently ensured. Incidentally, the glass transition temperature (Tg ac) of the acrylic polymer is determined according to the following formula (1):

[Math. 3]

$$\frac{1}{Tg\ ac} = \sum_{n=1}^{n} \frac{Wn}{Tg\ n} \qquad (1)$$

Tg ac: the glass transition temperature (temperature unit: K) of the acrylic polymer, Tg n: the glass transition temperature (temperature unit: K) when the acrylic monomer n becomes a homopolymer, and Wn: the weight fraction of the monomer components based on the entire acrylic polymer (here, the total sum of monomer components is 1, that is, $\Sigma Wn=1$).

As for the glass transition temperature (Tg n) of the homopolymer when formed, which is used as basic data for determining the glass transition temperature (Tg ac) of the acrylic polymer (copolymer) according to formula (1), numerical values described, for example, in POLYMER HANDBOOK, Fourth Edition (JOHN WILLY & SONS, INC.), IV, pp. 193-277, may be employed.

The kind, combination, amount used and the like of the acrylic monomer are appropriately determined by taking into account the compatibility with urethane, the polymerizability during photocuring with radiation or the like, and the characteristics of the polymer obtained.

In the present invention, a monomer such as vinyl acetate, vinyl propionate, styrene, acrylamide, methacrylamide, a monoester or diester of maleic acid, a derivative thereof, N-methylolacrylamide, glycidyl acrylate, glycidyl methacrylate, N,N-dimethylaminoethyl acrylate, N,N-dimethylaminopropyl methacrylamide, 2-hydroxypropyl acrylate, N,N-dimethylacrylamide, N,N-diethyl acrylamide, imide acrylate, N-vinylpyrrolidone, oligoester acrylate, ε-caprolactone acrylate, dicyclopentenyl acrylate, dicyclopentenyl acrylate, methoxylated cyclododecatriene acrylate and methoxyethyl acrylate may be copolymerized together with the above-described acrylic monomer. Incidentally, the kind and amount used of the monomer to be copolymerized are appropriately determined by taking into account the characteristics and the like of the composite film.

Furthermore, other polyfunctional monomers can also be added within the range not impairing the characteristics. Examples of the polyfunctional monomer include ethylene glycol diacrylate, propylene glycol diacrylate, hexanediol diacrylate, neopentyl glycol diacrylate, trimethylolpropane triacrylate, pentaerythritol triacrylate, dipentaerythritol hexaacrylate, urethane acrylate, epoxy acrylate and polyester acrylate. Of these, trimethylolpropane triacrylate is particularly preferred.

The polyfunctional monomer can be contained in an amount of 1 to 20 parts by weight per 100 parts by weight of the acrylic monomer. When the content of the polyfunctional monomer is 1 part by weight or more, the cohesive force of the composite film is sufficient, and when it is 20 parts by weight or less, the elastic modulus does not become too high and the film can follow the unevenness of the adherend surface.

In the present invention, the weight ratio between the acrylic polymer and the urethane-based polymer in the composite film is preferably acrylic polymer/urethane-based polymer=from 20/80 to 80/20, more preferably from 30/70 to 70/30. If the ratio of the acrylic polymer contained is less than 20/80, the viscosity of the composite film precursor is increased to cause poor workability when performing coating or the like, but when the content ratio is from 20/80 to 80/20, the workability can be satisfactorily ensured, The urethane polymer is obtained by reacting a diol with a diisocyanate.

As to the diol, for example, a diol having a high molecular weight may be used. Examples of the diol having a high molecular weight include a polyether polyol obtained by addition polymerization of ethylene oxide, propylene oxide, tetrahydrofuran or the like; a polyester polyol composed of a polycondensation product of the above-described dihydric alcohol or a dihydric alcohol such as 1,4-butanediol and 1,6-hexanediol and a divalent basic acid such as adipic acid, azelaic acid and sebacic acid; an acrylic polyol; a carbonate polyol; an epoxy polyol; and a caprolactone polyol. Among these, for example, a polyoxytetramethylene glycol (PTMG) and a polyalkylene carbonate diol (PCD) are preferably used.

Examples of the acrylic polyol include a copolymer of hydroxyl group-containing monomers, and a copolymer of a hydroxyl group-containing material and an acrylic monomer. Examples of the epoxy polyol include an amine-modified epoxy resin.

In the present invention, the urethane polymer contains no crosslinked structure. The diol used for the formation of the urethane polymer is preferably a linear diol. However, as long as the condition that a crosslinked structure is not formed in the urethane polymer is satisfied, the diol may be a diol with a side chain or a dial containing a branched structure. That is, the urethane polymer constituting the composite film of the present invention does not contain a crosslinked structure.

In the present invention, a polyol having a low molecular weight, a diamine having a low molecular weight, or the like may be used as a chain extender, if desired, at the polymerization of the urethane polymer.

Examples of the polyol having a low molecular weight include a dihydric alcohol such as ethylene glycol, diethylene glycol, propylene glycol, butylene glycol, hexamethylene glycol and cyclohexane dimethanol, and a trihydric alcohol such as trimethylolpropane.

Examples of the diamine having a low molecular weight include 4,4'-methylenebis-o-chloroaniline (MOCA), 3,3'-dimethylbenzidine, 3,3'-dichlorobenzidine, benzidine and p-phenylenediamine.

In the present invention, the above-described dials can be used individually or in combination by taking into consideration the solubility in acrylic monomer, the reactivity with isocyanate, and the like. In the case where strength is required, it is effective to increase the amount of the urethane hard segment by using chain extenders individually or in combination. In the case of putting an importance on the elongation, a diol having a large molecular weight is preferably used alone. Also, the polyether polyol is generally inexpensive and exhibits good water resistance, and the polyester polyol has high strength. In the present invention, the kind and amount of the polyol can be freely selected according to the usage and purpose, and the kind, molecular weight and amount used of the polyol can be appropriately selected also from the aspect of, for example, the characteristics of base material or the like on which the film is coated, the reactivity with isocyanate, or the compatibility with acryl.

Examples of the diisocyanate include aromatic, aliphatic and alicyclic diisocyanates, and dimers and trimers of these diisocyanates. Examples of the aromatic, aliphatic and alicyclic diisocyanates include tolylene diisocyanate (TDI), diphenylmethane diisocyanate (MDI), xylylene diisocyanate (XDI), naphthylene diisocyanate (NDI), phenylene diisocyanate (PPDI), m-tetramethylxylylene diisocyanate (TMXDI), methylcyclohexane diisocyanate (hydrogenated TDI), dicyclohexylmethane diisocyanate (hydrogenated MDI), cyclohexane diisocyanate (hydrogenated PPDI), bis (isocyanatomethyl)cyclohexane (hydrogenated XDI), norbornene diisocyanate (NBDI), isophorone diisocyanate (IPDI), hexamethylene diisocyanate (HDI), butane diisocyanate, 2,2,4-trimethylhexamethylene diisocyanate and 2,4,4-trimethylhexamethylene diisocyanate. Also, dimers and trimers of these diisocyanates, and a polyphenylmethane diisocyanate may be used. Examples of the trimer include isocyanurate type, biuret type and allophanate type, and these trimers can be appropriately used.

The diisocyanates above may be used individually or in combination, The kind, combination and the like of the diisocyanates may be appropriately selected from the aspect of, for example, the characteristics of base material or the like to which the composite film is applied (for example, is coated), the solubility in acrylic monomer, or the reactivity with hydroxyl group.

In the present invention, as for the amounts of the diol component and the diisocyanate component used for forming the urethane polymer, the amount used of the diol component based on the diisocyanate component is, in terms of NCO/OH (equivalent ratio), preferably from 1.1 to 2.0, more preferably from 1.15 to 1.35. If the NCO/OH (equivalent ratio) is less than 1.1, the film strength is liable to decrease. When the NCO/OH (equivalent ratio) is 2.0 or less, elongation and sufficient flexibility can be ensured.

A hydroxyl group-containing acrylic monomer may also be added to the above-described urethane polymer. When a hydroxyl group-containing acrylic monomer is added, a (meth)acryloyl group can be introduced into the molecular terminal of the urethane prepolymer, whereby copolymerizability with the acrylic monomer is imparted and compatibility between the urethane component and the acrylic component is increased, as a result, the tensile properties such as breaking strength can also be enhanced. As for the hydroxyl group-containing acrylic monomer, hydroxyethyl(meth) acrylate, hydroxypropyl(meth)acrylate, hydroxybutyl(meth) acrylate, hydroxyhexyl(meth)acrylate, cyclohexanedimethanol mono(meth)acrylate or the like is used. The amount of the hydroxyl group-containing (meth)acrylic monomer used is preferably from 0.1 to 10 parts by weight, more preferably from 1 to 5 parts by weight, per 100 parts by weight of the urethane polymer.

In the present invention, the glass transition temperature (Tg ur) of the urethane polymer is preferably 273 K or less. If the glass transition temperature (Tg ur) of the urethane polymer exceeds 273 K, the low-temperature flexibility of the composite film may be insufficient or when producing the composite film, the viscosity of the composite film precursor may rise excessively. When the glass transition temperature is 273 K or less, sufficient flexibility and appropriate viscosity of the composite film precursor are achieved.

In the present invention, the glass transition temperature (Tg com) of the composite film is preferably 269 K or less. If the glass transition temperature (Tg com) of the composite film exceeds 269 K, flexibility may lack when the film is used in a low-temperature environment, and therefore, at the lamination to an adherend, the film may not follow the curved surface of the adherend or a lamination failure may occur in the stepped portion of the adherend. On the other hand, when the glass transition temperature of the composite film is 269 K or less, sufficient flexibility and excellent followability to the curved surface of adherend are achieved. The glass transition temperature (Tg com) of the composite film is determined according to the following formula (2):

[Math. 4]

$$\frac{1}{Tg\ com} = \frac{W\ ac}{Tg\ ac} + \frac{W\ ur}{Tg\ ur} \qquad (2)$$

Tg com: the glass transition temperature (temperature unit: K) of the composite film, Tg ac: the glass transition temperature (temperature unit: K) of the acrylic polymer calculated according to formula (1), Tg ur: the glass transition temperature (temperature unit: K) of the urethane polymer, W ac: the weight fraction of the acrylic polymer in the composite film, and W ur: the weight fraction of the urethane polymer in the composite film (here, W ac+W ur=1).

In the composite film, an additive usually used, for example, additives such as ultraviolet absorber, hindered amine light stabilizer, antioxidant, filler, pigment, coloring agent and antistatic agent, may be added, if desired, within the range not impairing the effects of the present invention. Such an additive is used in a normal amount according to its kind or the like. Also, this additive may be previously added before the polymerization reaction of diisocyanate and diol, or may be added before each of the urethane polymer and the acrylic monomer is polymerized.

Also, a small amount of a solvent may be added so as to adjust the viscosity on coating. The solvent may be appropriately selected from solvents usually used, and examples thereof include ethyl acetate, toluene, chloroform and dimethylformamide.

In producing the composite film of the present invention, for example, a reaction of a diol with a diisocyanate is first performed in an acrylic monomer to form a urethane polymer by using the acrylic monomer as a diluent, whereby a mixture containing the acrylic monomer and the urethane polymer as main components is formed (precursor mixture).

This precursor mixture is coated on a base material (which is release-treated, if desired) or the like and cured by irradiating, for example, ionizing radiation such as α-ray, β-ray, γ-ray, neutron ray and electron beam, radiation such as ultraviolet ray, or visible light, according to the kind or the like of the photopolymerization initiator and then, the base material or the like is separated and removed, whereby a composite film can be formed. Alternatively, the film may be obtained in the form of a composite film being stacked on the base material or the like without separating and removing the base material or the like. Incidentally, in the present invention, a cast film is included in the base material.

Specifically, after the diol is dissolved in the acrylic monomer, the diisocyanate and the like are added and reacted with the diol to adjust the viscosity, thereby forming a mixture, and this mixture (precursor mixture) is coated on the base material or the like or, if desired, on the release-treated surface of the base material or the like and then cured using a low-pressure mercury lamp or the like, whereby a composite film can be obtained. In this method, the acrylic monomer may be added at a time or dividedly several dimes during the synthesis of urethane. Alternatively, after dissolving the diisocyanate in the acrylic monomer, the diol may be reacted therewith. According to this method, the molecular weight is not limited and a polyurethane having a high molecular weight can be produced, so that the molecular weight of the finally obtained urethane can be designed to a desired size.

At this time, in order to avoid polymerization inhibition by oxygen, a release-treated sheet (separator or the like) may be put on the precursor mixture coated on the base material or the like to block oxygen, or the base material may be placed in a vessel filled with an inert gas to decrease the oxygen concentration.

In the present invention, the kind of radiation or the like and the kind of the lamp used for irradiation can be appropriately selected and, for example, a low-pressure lamp such as fluorescent chemical lamp, black light and germicidal lamp, or a high-pressure lamp such as metal halide lamp and high-pressure mercury lamp, may be used.

The irradiation amount of ultraviolet rays or the like can be set arbitrarily according to the characteristics required of the film. In general, the irradiation amount of ultraviolet rays is from 100 to 5,000 mJ/cm$^2$, preferably from 1,000 to 4,000 mJ/cm$^2$, more preferably from 2,000 to 3,000 mJ/cm$^2$. If the irradiation amount of ultraviolet rays is less than 100 mJ/cm$^2$, a sufficiently high polymerization ratio may not be obtained, whereas if it exceeds 5,000 mJ/cm$^2$, this may give rise to deterioration.

The temperature when irradiating ultraviolet rays or the like is not particularly limited and can be arbitrarily set, but if the temperature is too high, a termination reaction readily occurs due to heat of polymerization and this is liable to cause impairment of the characteristics. Therefore, the temperature is usually 70° C. or less, preferably 50° C. or less, more preferably 30° C. or less.

In the present invention, when the above-described composite film (a film in a state of being not laminated on the base material or the like) is subjected to a tensile test at a temperature of 5° C., the maximum load at an elongation of 0.1 to 20% is preferably 30 N/10 mm or less. If this maximum load exceeds 30 N/10 mm, the film is deprived of flexibility in a low-temperature environment and may decrease in the followability to the adherend surface at the lamination work. When the maximum load is 30 N/10 mm or less, the workability at the laminating operation to an adherend is not deteriorated and good workability can be adequately ensured.

Also, when a tensile test is performed at 20° C., the above-described composite film of the present invention preferably has a breaking load of 30 N/10 mm or more and an elongation of 150% or more. With a breaking load of 30 N/10 mm or more, sufficient strength as a film is exhibited and with an elongation of 150% or more, good workability can be adequately ensured at the lamination to an adherend.

The thickness of the composite film of the present invention can be appropriately selected according to the purpose or the like. For example, in the case of a protective sheet used for protecting an automotive body, the thickness of the composite film is preferably on the order of 50 to 500 μm, more preferably on the order of 100 to 300 μm.

The composite film of the present invention may be used as it is or may also be used as a pressure-sensitive adhesive sheet by forming a pressure-sensitive adhesive layer on one surface or both surfaces. The composition of the pressure-sensitive adhesive is not particularly limited, and a general composition such as acrylic type and rubber type may be used. Also, the method for forming the pressure-sensitive adhesive is not particularly limited, and there may be applied, for example, a method of directly coating a solvent-based or emulsion-based pressure-sensitive adhesive on the composite film and drying it, or a method of coating such a pressure-sensitive adhesive on a release paper to previously form a pressure-sensitive adhesive layer and then laminating the pressure-sensitive adhesive layer to the composite film. A method where a radiation-curable pressure-sensitive adhesive is coated on the composite film and radiation is irradiated on both the pressure-sensitive adhesive layer and the film to simultaneously cure the composite film and the pressure-sensitive adhesive layer thereby forming the layer, may also be applied. Incidentally, in this case, the pressure-sensitive adhesive layer may be coated on the composite film to fabricate a multilayer configuration. Also, after providing the pressure-sensitive adhesive layer on a separator, the composite film may be formed thereon.

The thickness of the pressure-sensitive adhesive layer is not particularly limited and may be arbitrarily set but usually, the thickness is preferably from 3 to 100 µm, more preferably from 10 to 50 µm.

Examples of the material used for constituting the base material for use in the present invention include a polyester-based resin such as polyethylene terephthalate (PET) and polybutylene terephthalate (PBT); a polyolefin-based resin such as polyethylene (PE), polypropylene (PP), high-density polyethylene and biaxially-oriented polypropylene; a thermoplastic resin such as polyimide (PI), polyether ether ketone (PEEK), polyvinyl chloride (PVC), polyvinylidene chloride-based resin, polyamide-based resin, polyurethane-based resin, polystyrene-based resin, acryl-based resin, fluorine-based resin, cellulose-based resin and polycarbonate-based resin; and a thermosetting resin. Such a material is usually used in a film form. Among these, PET is preferably used because this resin exhibits appropriate hardness in use for the processing of precision components and further is advantageous in view of wide product variety and cost. Preferably, the base material is appropriately determined according to the application or the kind or the like of the pressure-sensitive adhesive layer provided, if desired, and for example, in the case of providing an ultraviolet ray-curable pressure-sensitive adhesive, a base material having a high ultraviolet transmittance is preferred.

In the present invention, a coat layer may be provided on one surface or both surfaces of the composite film. By providing a coat layer, characteristic features such as surface gloss, wear resistance, abrasion resistance, slipperiness, antifouling property and water repellency can be imparted, and the coat layer also has an effect of suppressing deterioration of the composite film itself. The material forming the coat layer is not particularly limited, but a general material, for example, a resin such as (meth)acrylate type, urethane type, urethane acrylate type, silicone type, fluorocompound type, polyolefin type and polycarbonate type, or a metal deposit, can be used. The coat layer is preferably a layer formed using a fluorocompound-based resin and, for example, is preferably a fluorine-based coat layer such as fluoroethylene vinyl ether layer.

The method for forming the coat layer is not particularly limited, but examples of the method which can be applied include: a method of directly coating a coat agent of solvent type, emulsion type or the like on the composite film and drying it; a method of applying the coat agent on a release paper to previously form a coat layer and transferring the coat layer to the composite film by thermo-compression bonding or the like; a method of previously forming a coat layer on a release-treated film and then curing and thereby forming the composite film on the coat layer; a method of previously forming a coat layer on a release-treated film by using a radiation-curable coat agent and then transferring the coat layer to the composite film; a method of applying a radiation-curable coat agent on one surface of the composite film, coating a radiation-curable pressure-sensitive adhesive on the other surface, and irradiating radiation thereon, preferably irradiating radiation from both surface sides of the composite film, to simultaneously cure the coat layer and the pressure-sensitive adhesive layer; and a method of vapor-depositing a metal oxide on the composite film to form a coat layer.

In the present invention, in the case of providing the coat layer, a configuration having the coat layer on one surface of the composite film and having the pressure-sensitive adhesive layer on the other surface, for example, pressure-sensitive adhesive layer/composite film/coat layer, is preferably fabricated. The composite film having this configuration is suitable as a protective sheet for protecting the painted surface of automobiles, airplanes and the like, or the surface of buildings and the like. Incidentally, in the present invention, those having such a configuration and those having a configuration of pressure-sensitive adhesive layer/composite film are sometimes collectively referred to as a "composite film".

The thickness of the coat layer is preferably from 1 to 50 µm, more preferably from 1 to 30 µm. If the thickness of the coat layer is less than 1 µm, a defect portion in which the coat layer is not formed, such as pinhole, is readily generated and also, the characteristics of the coat layer may not be exerted sufficiently, whereas if it exceeds 50 µm, the physical properties of the coat layer may impair the physical properties of the composite film.

The composite film of the present invention can satisfy both high strength and high breaking elongation and is also excellent in the flexibility to a curved surface. Accordingly, the composite film is suitable as a protective sheet or the like for protecting the painted surface of automobiles, airplanes and the like and can be used, for example, by laminating it on a pressure-sensitive adhesive, for example, coated on an adherend such as automotive painted surface and building. Alternatively, the composite film can also be used as a pressure-sensitive adhesive sheet by providing a pressure-sensitive adhesive layer on the composite film and in this case, the pressure-sensitive adhesive sheet is suitable as an anti-chipping sheet that is laminated and applied on an automotive body and the like. Moreover, the composite film of the present invention can exhibit excellent low-temperature flexibility while maintaining the film strength and therefore, is excellent particularly in the curved surface followability, step followability (step absorptivity) and the like, that is, can successfully follow the adherend surface even when a curved surface or a step is present therein.

EXAMPLES

The present invention is described in detail below by referring to Examples, but the present invention is not limited thereto. In the following Examples, unless otherwise indicated, the "parts" means "parts by weight" and "%" means "wt %". Also, in the calculation of the glass transition temperature of the acrylic polymer used in the following Examples, the numerical value shown below was used as the glass transition temperature of the homopolymer related to each acryl component. The measurement methods and evaluation methods used in Examples are described below.

(1) Glass Transition Temperature of Homopolymer Related to Acryl Component

| | |
|---|---|
| Acrylic acid | 378 K |
| n-Butyl acrylate | 219 K |
| Isobornyl acrylate | 370 K |
| Acryloylmorpholine | 418 K |

-continued

| 2-Hydroxyethyl acrylate | 258 K |
| 4-Hydroxybutyl acrylate | 241 K |

(2) Measurement of Glass Transition Temperature of Urethane Polymer by Differential Scanning Calorimetry (DSC)

The obtained urethane polymer-acrylic monomer mixture was heated at 150° C. for 3 hours to remove the acrylic monomer by heating. About 10 mg of the remaining solid content (urethane polymer) was sampled and placed in an aluminum-made vessel and after putting a lid thereon and tightly closing the vessel, the glass transition temperature of the urethane polymer was measured by performing differential scanning calorimetry (DSC). An analyzer DSC6220 manufactured by SII Nano Technology Inc. was used, and the measurement was performed in the temperature range of −100° C. to 200° C. at a temperature rise rate of 10° C./min in a nitrogen atmosphere.

(3) Evaluation of Mechanical Properties
(Breaking Elongation at 20° C., Breaking Load at 20° C., and Maximum Load in an Elongation Range of 0.1 to 20% at 5° C.)

The composite film was cut into a size of 10 mm (width)× 130 mm (length), and the separator and release-treated polyethylene terephthalate film were removed to prepare a sample film. This sample film was subjected to a tensile test using a tensile tester ("Autograph Model ASG-50D" manufactured by Shimadzu Corporation) at a tensile rate of 200 mm/min with a chuck-to-chuck distance of 50 mm at 20° C., and a stress-distortion curve was obtained. Also, the load when the film was broken was determined and used as a breaking load (unit: N/10 mm) at 20° C., and the distortion (elongation percentage) when the film was broken was determined and used as a breaking elongation (unit: %) at 20° C.

Furthermore, the same tensile test as above was performed also at a temperature of 5° C. to obtain a stress-distortion curve, and the maximum load (unit: N/10 mm) in the elongation range of 0.1 to 20% was determined.

Example 1

4.92 Parts of acrylic acid as an acrylic monomer, 34.44 parts of isobornyl acrylate and 9.84 parts of n-butyl acrylate as monofunctional acrylic monomers, and 35.82 parts of polyoxytetramethylene glycol (PTMG) (number average molecular weight: 650, produced by Mitsubishi Chemical Corporation) as a polyol, were charged into a reaction vessel equipped with a condenser, a thermometer and a stirring device, and while stirring, 13.38 parts of hydrogenated xylylene diisocyanate (HXDI) was added dropwise thereto. After allowing the reaction to proceed at 65° C. for 10 hours, 1.60 parts of 2-hydroxyethyl acrylate was charged, and the mixture was stirred for 1 hour to obtain a urethane polymer-acrylic monomer mixture. The amounts of polyisocyanate component and polyol component used were in a ratio of NCO/OH (equivalent ratio)-1.25. Also, the weight ratio of urethane polymer/acrylic monomer was 49.2/50.8.

Thereafter, 1.25 parts of an ultraviolet absorber (TINUVIN 400, produced by Ciba Japan K.K.) and 1.25 parts of a hindered amine light stabilizer (TINUVIN 123, produced by Ciba Japan K.K.) were added. Furthermore, bis(2,4,6-trimethylbenzoyl)phenyl-phosphine oxide (IRGACURE 819, produced by Ciba Japan K.K.) as a photopolymerization initiator was added to account for 0.3 parts based on the acryl component, and the mixture was then thoroughly stirred to completely dissolve the additives and the like, whereby a composite film precursor mixture was obtained.

Separately, a coat layer was formed on a PET film. That is, 10.15 parts of an isocyanate crosslinking agent ("CORONATE HX", produced by Nippon Polyurethane Industry Co., Ltd.) as a curing agent and 3.5 parts of a xylene diluted solution of dibutyltin laurate ("OL1", produced by Tokyo Fine Chemical Co., Ltd.) (concentration of dibutyltin laurate: 0.01 wt %) as a catalyst were added to 100 parts by weight of a solution of fluoroethylene vinyl ether in xylene and toluene ("LF600", produced by Asahi Glass Co., Ltd.) to prepare a coating solution for fluoroethylene vinyl ether layer. This coating solution was coated on a 75 μm-thick release-treated polyethylene terephthalate (PET) film to have a thickness of 10 μm after curing and then, was dried and cured at a temperature of 140° C. for 3 minutes to form a fluoroethylene vinyl ether layer on the PET film.

The composite film precursor mixture prepared above was coated on the fluoroethylene vinyl ether layer to have a thickness of 300 μm after curing. Furthermore, a release-treated polyethylene terephthalate (PET) film (thickness 38 μm) was overlaid and coated as a separator thereon, and the covering separator surface was irradiated with an ultraviolet ray (illuminance: 290 mW/cm$^2$, light quantity: 4,600 mJ/cm$^2$) by using a metal halide lamp to cure the coating, whereby a laminate having a coat layer and a composite film (provided with a separator) in this order on a release-treated PET film was formed.

The obtained composite film was evaluated for mechanical properties according to the method described above. The results are shown in Table 1.

Example 2

8.63 Parts of acrylic acid as an acrylic monomer, 30.60 parts of isobornyl acrylate as a monofunctional acrylic monomer, and 42.84 parts of polyoxytetramethylene glycol (PTMG) (number average molecular weight: 650, produced by Mitsubishi Chemical Corporation) as a polyol, were charged into a reaction vessel equipped with a condenser, a thermometer and a stirring device, and while stirring, 16.01 parts of hydrogenated xylylene diisocyanate (HXDI) was added dropwise thereto. After allowing the reaction to proceed at 65° C. for 10 hours, 1.92 parts of 2-hydroxyethyl acrylate was charged, and the mixture was stirred for 1 hour to obtain a urethane polymer-acrylic monomer mixture. At this time, the weight ratio of urethane polymer/acrylic monomer was 58.9/41.1.

Thereafter, a composite film precursor mixture was prepared in the same manner as in Example 1, and a laminate of release-treated PET film/coat layer/composite film (provided with a separator) was produced in the same manner as in Example 1. For the obtained composite film, the same measurements and evaluations as in Example 1 were performed. The results are shown in Table 1.

Example 3

4.90 Parts of acrylic acid as an acrylic monomer, 34.80 parts of isobornyl acrylate and 9.31 parts of n-butyl acrylate as monofunctional acrylic monomers, and 35.68 parts of polyoxytetramethylene glycol (PTMG) (number average molecular weight: 650, produced by Mitsubishi Chemical Corporation) as a polyol, were charged into a reaction vessel equipped with a condenser, a thermometer and a stirring device, and while stirring, 13.33 parts of hydrogenated xylylene diisocyanate (III) was added dropwise thereto. After allowing the reaction to proceed at 65° C. for 10 hours, 1.98 parts of 4-hydroxybutyl acrylate was charged, and the mixture was stirred for 1 hour to obtain a urethane polymer-acrylic monomer mixture. At this time, the weight ratio of urethane polymer/acrylic monomer was 49/51.

Thereafter, a composite film precursor mixture was prepared in the same manner as in Example 1 except for further charging 3.0 parts of trimethylolpropane triacrylate as a polyfunctional acrylate. Also, a laminate of release-treated PET film/coat layer/composite film (provided with a separator) was produced in the same manner as in Example 1. For the obtained composite film, the same measurements and evaluations as in Example 1 were performed. The results are shown in Table 1.

Example 4

5.44 Parts of acrylic acid as an acrylic monomer, 27.21 parts of isobornyl acrylate and 21.77 parts of n-butyl acrylate as monofunctional acrylic monomers, and 35.82 parts of polycarbonate diol ("T5651", trade name, produced by Asahi Kasei Chemicals Corporation) as a polyol, were charged into a reaction vessel equipped with a condenser, a thermometer and a stirring device, and while stirring, 8.71 parts of hydrogenated xylylene diisocyanate (HXDI) was added dropwise thereto. After allowing the reaction to proceed at 65° C. for 10 hours, 1.04 parts of 2-hydroxyethyl acrylate was charged, and the mixture was stirred for 1 hour to obtain a urethane polymer-acrylic monomer mixture. At this time, the weight ratio of urethane polymer/acrylic monomer was 44.5/55.5.

Thereafter, a composite film precursor mixture was prepared in the same mariner as in Example 1, and also, a laminate of release-treated PET film/coat layer/composite film (provided with a separator) was produced in the same manner as in Example 1. For the obtained composite film, the same measurements and evaluations as in Example 1 were performed. The results are shown in Table 1.

Example 5

7.36 Parts of acrylic acid as an acrylic monomer, 25.76 parts of isobornyl acrylate and 11.19 parts of n-butyl acrylate as monofunctional acrylic monomers, 35.43 parts of polyoxytetramethylene glycol (PTMG) (number average molecular weight: 650, produced by Mitsubishi Chemical Corporation) as a polyol, and 1.64 parts of 1,4-butanediol as a dial having a low molecular weight were charged into a reaction vessel equipped with a condenser, a thermometer and a stirring device, and while stirring, 16.93 parts of hydrogenated xylylene diisocyanate (1-1×DI) was added dropwise thereto. After allowing the reaction to proceed at 65° C. for 10 hours, 1.69 parts of 2-hydroxyethyl acrylate was charged, and the mixture was stirred for 1 hour to obtain a urethane polymer-acrylic monomer mixture. Incidentally, the amounts of polyol component and low molecular-weight dial used were in a ratio of NCO/01-1 (equivalent ratio)=1.20. Furthermore, the weight ratio of urethane polymer/acrylic monomer was 54/46.

Thereafter, a composite film precursor mixture was prepared in the same manner as in Example 1, and also, a laminate of release-treated PET film/coat layer/composite film (provided with a separator) was produced in the same manner as in Example 1. For the obtained composite film, the same measurements and evaluations as in Example 1 were performed. The results are shown in Table 1.

Comparative Example 1

5.42 Parts of acrylic acid as an acrylic monomer, 43.36 parts of isobornyl acrylate and 5.42 parts of n-butyl acrylate as monofunctional acrylic monomers, and 32.29 parts of polyoxytetramethylene glycol (PTMG) (number average molecular weight: 650, produced by Mitsubishi Chemical Corporation) as a polyol were charged into a reaction vessel equipped with a condenser, a thermometer and a stirring device, and while stirring, 12.07 parts of hydrogenated xylylene diisocyanate (HXDI) was added dropwise thereto. After allowing the reaction to proceed at 65° C. for 10 hours, 1.44 parts of 2-hydroxyethyl acrylate was charged, and the mixture was stirred for 1 hour to obtain a urethane polymer-acrylic monomer mixture. At this time, the weight ratio of urethane polymer/acrylic monomer was 44.4155.6.

Thereafter, a composite film precursor mixture was prepared in the same manner as in Example 1, and also, a laminate of release-treated PET film/coat layer/composite film (provided with a separator) was produced in the same manner as in Example 1. For the obtained composite film, the same measurements and evaluations as in Example 1 were performed. The results are shown in Table 1.

Comparative Example 2

5.42 Parts of acrylic acid as an acrylic monomer, 46.07 parts of isobornyl acrylate and 232 parts of acryloyl morpholine as monofunctional acrylic monomers, and 32.29 parts of polyoxytetramethylene glycol (PTMG) (number average molecular weight: 650, produced by Mitsubishi Chemical Corporation) as a polyol were charged into a reaction vessel equipped with a condenser, a thermometer and a stirring device, and while stirring, 12.07 parts of hydrogenated xylylene diisocyanate (HXDI) was added dropwise thereto. After allowing the reaction to proceed at 65° C. for 10 hours, 1.45 parts of 2-hydroxyethyl acrylate was charged, and the mixture was stirred for 1 hour to obtain a urethane polymer-acrylic monomer mixture. At this time, the weight ratio of urethane polymer/acrylic monomer was 44.4/55.6.

Thereafter, a composite film precursor mixture was prepared in the same manner as in Example 1, and also, a laminate of release-treated PET film/coat layer/composite film (provided with a separator) was produced in the same manner as in Example 1. For the obtained composite film, the same measurements and evaluations as in Example 1 were performed. The results are shown in Table 1.

Comparative Example 3

9.0 Parts of acrylic acid as an acrylic monomer, 39.0 parts of isobornyl acrylate and 12.0 parts of n-butyl acrylate as monofunctional acrylic monomers, and 29.12 parts of polyoxytetramethylene glycol (PTMG) (number average molecular weight: 650, produced by Mitsubishi Chemical Corporation) as a polyol were charged into a reaction vessel equipped with a condenser, a thermometer and a stirring device, and while stirring, 10.88 parts of hydrogenated xylylene diisocyanate (HXDI) was added dropwise thereto. By allowing the reaction to proceed at 65° C. for 10 hours, a urethane polymer-acrylic monomer mixture was obtained. At this time, the weight ratio of urethane polymer/acrylic monomer was 40/60.

Thereafter, a composite film precursor mixture was prepared in the same manner as in Example 1, and also, a laminate of release-treated PET film/coat layer/composite film (provided with a separator) was produced in the same manner as in Example 1. For the obtained composite film, the same measurements and evaluations as in Example 1 were performed. The results are shown in Table 1.

Comparative Example 4

6.00 Parts of acrylic acid as an acrylic monomer, 36.0 parts of isobornyl acrylate and 18.0 parts of n-butyl acrylate as monofunctional acrylic monomers, and 32.18 parts of polycarbonate diol ("T5651", trade name, produced by Asahi Kasei Chemicals Corporation) as a polyol were charged into a reaction vessel equipped with a condenser, a thermometer and a stirring device, and while stirring, 7.82 parts of hydrogenated xylylene diisocyanate (HXDI) was added dropwise thereto. By allowing the reaction to proceed at 65° C. for 10 hours, a urethane polymer-acrylic monomer mixture was obtained. At this time, the weight ratio of urethane polymer/acrylic monomer was 40/60.

Thereafter, a composite film precursor mixture was prepared in the same manner as in Example 1, and also, a laminate of release-treated PET film/coat layer/composite film (provided with a separator) was produced in the same manner as in Example 1. For the obtained composite film, the same measurements and evaluations as in Example 1 were performed. The results are shown in Table 1.

Comparative Example 5

6.0 Parts of acrylic acid as an acrylic monomer, 36.0 parts of isobornyl acrylate and 18.0 parts of n-butyl acrylate as monofunctional acrylic monomers, and 31.46 parts of polycarbonate diol ("ETERNACOLLUM 90", trade name, produced by Ube Industries, Ltd.) as a polyol were charged into a reaction vessel equipped with a condenser, a thermometer and a stirring device, and while stirring, 8.54 parts of hydrogenated xylylene diisocyanate (HXDI) was added dropwise thereto. By allowing the reaction to proceed at 65° C. for 10 hours, a urethane polymer-acrylic monomer mixture was obtained. At this time, the weight ratio of urethane polymer/acrylic monomer was 40/60.

Thereafter, a composite film precursor mixture was prepared in the same manner as in Example 1, and also, a laminate of release-treated PET film/coat layer/composite film (provided with a separator) was produced in the same manner as in Example 1. For the obtained composite film, the same measurements and evaluations as in Example 1 were performed. The results are shown in Table 1.

Comparative Example 6

7.33 Parts of acrylic acid as an acrylic monomer, 31.75 parts of isobornyl acrylate and 9.77 parts of n-butyl acrylate as monofunctional acrylic monomers, 25.91 parts of polyoxytetramethylene glycol (PTMG) (number average molecular weight: 650, produced by Mitsubishi Chemical Corporation) as a polyol, and 3.59 parts of 1,4-butanediol as a diol having a low molecular weight were charged into a reaction vessel equipped with a condenser, a thermometer and a stirring device, and while stirring, 19.35 parts of hydrogenated xylylene diisocyanate (HXDI) was added dropwise thereto. After allowing the reaction to proceed at 65° C. for 10 hours, 2.31 parts of 2-hydroxyethyl acrylate was charged, and the mixture was stirred for 1 hour to obtain a urethane polymer-acrylic monomer mixture. At this time, the weight ratio of urethane polymer/acrylic monomer was 48.8/51.2.

Thereafter, a composite film precursor mixture was prepared in the same manner as in Example 1, and also, a laminate of release-treated PET film/coat layer/composite film (provided with a separator) was produced in the same manner as in Example 1. For the obtained composite film, the same measurements and evaluations as in Example 1 were performed. The results are shown in Table 1.

TABLE 1

| | Weight Ratio of Urethane/Acryl | Tg ac (unit: K) | Tg ur (unit: K) | Tg com (unit: K) | Tensile Test at 5° C. Maximum Load (unit: N/10 mm) | Tensile Test at 20° C. | |
|---|---|---|---|---|---|---|---|
| | | | | | | Breaking Load (unit: N/10 mm) | Breaking Elongation (unit: %) |
| Example 1 | 49.2/50.8 | 323.1 | 220 | 262.6 | 15.6 | 37.9 | 359 |
| Example 2 | 58.9/41.1 | 364.3 | 220 | 262.8 | 20.6 | 97.7 | 354 |
| Example 3 | 49/51 | 323.2 | 220 | 262.8 | 22.8 | 72 | 252 |
| Example 4 | 44.5/55.5 | 289.85 | 245 | 268.0 | 29 | 32.1 | 425 |
| Example 5 | 54/46 | 313.5 | 228 | 260.7 | 15 | 30 | 349 |
| Comparative Example 1 | 44.4/55.6 | 343.8 | 220 | 275.1 | 38.7 | 75.5 | 429 |
| Comparative Example 2 | 44.4/55.6 | 368.7 | 220 | 283.6 | 60.7 | 85.3 | 435 |
| Comparative Example 3 | 40/60 | 326.1 | 220 | 273.4 | 59.4 | 51.2 | 412 |
| Comparative Example 4 | 40/60 | 307.1 | 245 | 278.8 | 43.85 | 55.2 | 384 |
| Comparative Example 5 | 40/60 | 307.1 | 264 | 288.3 | 92.9 | 80.6 | 363 |
| Comparative Example 6 | 48.8/51.2 | 322.2 | 244 | 278.6 | 84.6 | 99.7 | 368 |

As seen from Table 1, it is verified that the composite films of Examples 1 to 5 according to the present invention are a composite film having a glass transition temperature of 269 K or less and having a maximum load of 30 N/10 mm or less in the tensile test at 5° C. in an elongation range of 0.1 to 20%.

On the other hand, it is revealed that the composite films of Comparative Examples 1 to 6 are a composite film having a glass transition temperature of more than 269 K and having a maximum load exceeding 30 N/10 mm in the tensile test at 5° C. in an elongation range of 0.1 to 20%. In other words, these composite films have a problem in the low-temperature flexibility.

INDUSTRIAL APPLICABILITY

The composite film of the present invention can be suitably used as a film requiring flexibility and water resistance. For example, the composite film can be used as a film for protecting and decorating a surface exposed to a harmful environment including outdoor weather, solvent, dust, fat/oil and marine environment. The composite film is suitable also as an anti-chipping sheet for protecting an automotive body.

The invention claimed is:

1. A composite film comprising an acrylic polymer and a urethane polymer, wherein said acrylic polymer comprises an acryl component containing at least an acrylic acid-based monomer and a monofunctional acrylic monomer whose homopolymer has a glass transition temperature (Tg) of 273 K or more; a content of said acrylic acid-based monomer in said composite film is from 0.5 to 15 wt %; a glass transition temperature (Tg ac) of said acrylic polymer, represented by the following formula (1), is 273 K or more; a glass transition temperature (Tg ur) of said urethane polymer is 273 K or less; and a glass transition temperature (Tg) of the composite film, represented by the following formula (2), is 269 K or less:

[Math. 1]

$$\frac{1}{Tg\,ac} = \sum_{n=1}^{n} \frac{W\,n}{Tg\,n} \quad (1)$$

Tg ac: the glass transition temperature (temperature unit: K) of the acrylic polymer, Tg n: the glass transition temperature (temperature unit: K) when the acrylic monomer becomes a homopolymer, and Wn: the weight fraction of the monomer components based on the entire acrylic polymer (here, the total sum of monomer components is ΣWn=1);

[Math. 2]

$$\frac{1}{Tg\,com} = \frac{W\,ac}{Tg\,ac} + \frac{W\,ur}{Tg\,ur} \quad (2)$$

Tg com: the glass transition temperature (temperature unit: K) of the composite film Tg ac: the glass transition temperature (temperature unit: K) of the acrylic polymer calculated according to formula (1), Tg ur: the glass transition temperature (temperature unit: K) of the urethane polymer, W ac: the weight fraction of the acrylic polymer in the composite film, and W ur: the weight fraction of the urethane-based polymer in the composite film (here, Wac+Wur=1).

2. The composite film according to claim 1, wherein the composite film has, in a tensile test at 5° C., maximum load in an elongation range of 0.1 to 20.0% of 30 N/10 mm or less.

3. The composite film according to claim 1, wherein the composite film has, in a tensile test at 20° C., a breaking load of 30 N/10 mm or less and an elongation of 150% or more.

4. The composite film according to claim 1, wherein a weight ratio between said acrylic polymer and said urethane polymer is from 20/80 to 80/20.

5. The composite film according to claim 1, wherein a coat layer is further provided on at least one surface of said composite film.

6. The composite film according to claim 1, wherein a pressure-sensitive adhesive layer is further provided on at least one surface of said composite film.

7. The composite film according to claim 1, wherein a coat layer having a thickness of 1 to 50 μm is provided on one surface of said composite film and a pressure-sensitive adhesive layer is provided on another surface thereof.

8. The composite film according to claim 5, wherein an application tape is further provided on said coat layer.

9. The composite film according to claim 7, wherein an application tape is further provided on said coat layer.

* * * * *